W. O. LUM.
MOTOR CONTROL SYSTEM.
APPLICATION FILED JULY 24, 1914.
1,236,726.
Patented Aug. 14, 1917.
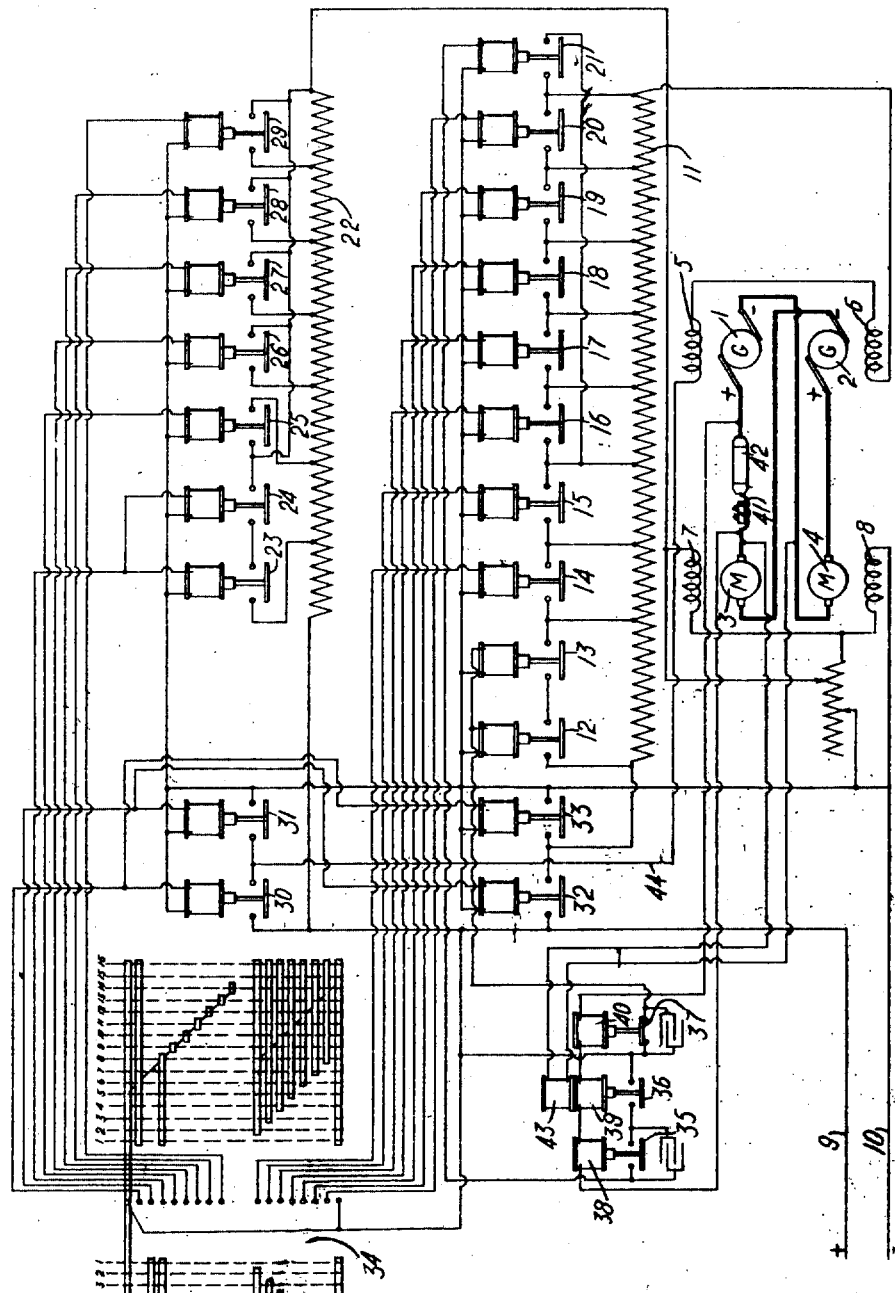
WITNESSES:
F. A. Lind
J. R. Langley
INVENTOR
Walter O. Lum
BY
[signature]
ATTORNEY

UNITED STATES PATENT OFFICE.

WALTER O. LUM, OF WILKINSBURG, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,236,726.   Specification of Letters Patent.   Patented Aug. 14, 1917.

Application filed July 24, 1914. Serial No. 852,777.

*To all whom it may concern:*

Be it known that I, WALTER O. LUM, a citizen of the United States, and a resident of Wilkinsburg, in the county of Allegheny and State of Pennsylvania, have invented a new and useful Improvement in Motor-Control Systems, of which the following is a specification.

My invention relates to motor control systems, and it has particular reference to such systems as may be employed in connection with rolling mills and similar machines.

My invention has for one of its objects to provide a simple and efficient means for controlling the speed of electric motors by varying the voltages of the sources of energy and by varying the excitation of the motor-field windings.

Another object of my invention is to provide a simple arrangement for connecting a plurality of generators and motors in circuit, whereby the voltage values obtaining in the circuit will not exceed that of a single generator.

A further object of my invention is to provide means for automatically controlling the current supplied to electric motors in accordance with conditions obtaining in the motor circuits.

In the operation of electrical systems comprising electric motors that are connected in a closed circuit with generators, it is highly desirable that the acceleration and retardation of the motors be controlled both by controlling the voltage of the generators and by varying the strengths of the motor fields. It is desirable also, in such systems, to prevent an excessive rush of current in the motor circuits, both when the motor is being accelerated and when the motor operates as a generator while being brought to rest.

I provide a simple system in which the acceleration and retardation of electric motors is controlled by electromagnetic switches that are manually controlled. A series of relay switches, which are automatically actuated only when the change in current value exceeds a predetermined rate, operates to prevent excessive rushes of current. The several generators and motors are connected alternately in circuit, and the maximum voltage obtaining in the circuit is that of a single generator.

In the accompanying drawing, the single figure is a diagrammatic view of circuits and apparatus embodying my invention.

Two generators 1 and 2 are connected in series with two motors 3 and 4, the generators and motors being arranged alternately in the circuit. The generators comprise separately excited field windings 5 and 6, and the motors comprise similarly excited field windings 7 and 8, respectively. Current is supplied to the several field windings through conductors 9 and 10 which may be connected to any suitable source of direct current. A resistor 11, which is in series with the generator field windings 5 and 6, is controlled by a series of electromagnetic switches 12, 13, 14, 15, 16, 17, 18, 19, 20 and 21. A resistor 22, which is in series with the motor field windings 7 and 8, is controlled by similar switches 23, 24, 25, 26, 27; 28 and 29. The direction of current through the generator field windings is controlled by reversing switches 30, 31, 32 and 33. The circuits of the magnet coils of the several switches, except switches 12, 13, and 21, are controlled by a master controller 34.

Three relay switches 35, 36 and 37 comprise magnet coils 38, 39 and 40, respectively, which are connected in parallel relation with a reactance device 41 and a resistor 42 that are in circuit with the motors and generators. The relay switch 36, which is a reverse-current relay, is provided with a coil 43 that is connected across the terminals of the generator 1 and which is wound to oppose the coil 39. The circuits of the switches 12 and 13 are controlled by the relay switch 37, and that of the switch 21 is controlled by the relay switch 35 and reverse-current relay switch 36.

Normally, the relay switches 35 and 36 are open and the relay switch 37 is closed to complete the circuits of the magnet coils of the switches 12 and 13, the latter being, therefore, normally closed to short circuit a section of the resistor 11. It may be assumed that the generators 1 and 2 are driven by any suitable prime mover and that the motors 3 and 4 are stationary. To start the motors, the master controller 34 is actuated in either direction, according to the direction of rotation desired. If, for example, the master controller 34 is actuated to the left, as shown, it operates, in its first position, to close the circuits of the magnet coils of the reversing switches 30 and 33 and the switches 23 and 24. The switches 23 and 24 complete a short circuit for the resistor 22, except a section of it, and thereby insure strong fields for the motors in starting.

The generator field windings are excited by means of a circuit extending from the positive conductor 9, through reversing switch 30, conductor 44, generator field windings 5 and 6, resistor 11 and reversing switch 33 to the negative conductor 10. The motor field windings 7 and 8 are excited by means of a circuit extending from the positive conductor 9 through a section of resistor 22, switches 23 and 24, and motor field windings 7 and 8 to the negative conductor 10. The main circuit extends from the positive brush of the generator 1, through resistor 42, reactance device 41, armature windings of motor 3, generator 2, and motor 4 to the negative brush of the generator 1.

Further actuation of the controller operates to successively close the circuits of the magnet coils 14, 15, 16, 17, 18, 19 and 20 to gradually cut out the resistor 11 and thus increase the excitation of the generator field windings. The motors are accelerated in accordance with the resultant increase in generator voltage.

In the ninth position of the controller, the switches 23 and 24 are opened and the switch 25 is closed. The section of the resistor 22 that is controlled by the switches 23 and 24 is thus inserted in circuit with the motor-field windings 7 and 8. Further actuation of the controller operates to successively close switches 26, 27, 28 and 29 and to simultaneously open the preceding switch to close. The resistor 22 is thus gradually inserted in circuit with the motor field windings 7 and 8, and the motors are, accordingly, further accelerated. In the final or running position of the controller, the switches 12, 13, 14, 15, 16, 17, 18, 19 and 20 are closed and the motors operate at their normal speed.

If the controller 34 is advanced too rapidly to increase the generator voltage, a sudden rush of current occurs in the main circuit. If the change in current exceeds a predetermined amount and occurs at a predetermined rate, the reactance device 41 operates to cause current to flow through the shunt circuit comprising the magnet coils of the relay switches 35, 36 and 37. The switch 37 then opens the circuit of the magnet coils of the switches 12 and 13 to thus insert a section of the resistor 11 in circuit with the generator field windings 5 and 6 to decrease the generator voltage. The operation of the switch 37 occurs before the excessive current has traversed the main circuit because the reactance device 41 increases the difference in potential across the terminals of the shunt circuit and thus causes the relay switches in the shunt circuit to anticipate rushes of current in the main circuit. The relay switch 37 operates, in the manner of the well known fluttering relay, to intermittently insert that section of the resistor controlled by the switches 12 and 13 in circuit with the generator field windings to decrease the generator voltage until the current traversing the circuit has been reduced to a normal value.

When it is desired to decrease the speed of the motors or to bring them to rest, the controller 34 is actuated toward its off position. The magnet coils of the several switches will be energized in the reverse order to first gradually cut out the resistor 22 from the circuit with the motor field windings and to gradually insert the resistor 11 in circuit with the generator field windings. During the retardation of the motors, they operate as generators to cause current to traverse the main circuit in the reverse direction. In case a sudden rush of current occurs, the reactance device 41 acts, in the manner above described, to energize the magnet coils of the relay switches 35, 36 and 37. The coils 39 and 43 of the reverse-current relay switch 36, which normally oppose each other, operate to close the switch 36 and thus complete the circuit of the switch 21. The switch 21 then closes to short circuit a large section of the resistor 11 and thus increase the voltage of the generators to such value that the current traversing the circuit is materially reduced. The switch 35 operates as a fluttering relay until the current traversing the main circuit is reduced to a normal value.

It will be noted that I provide a simple and efficient means for anticipating excessive rushes of current in the main circuit and preventing their occurrence before any damage can result. I provide, also, a simple system by means of which the motors may be accelerated and brought to rest safely and quickly.

While I have shown and described my invention as embodying a system of generator field control, it is obvious that it is adapted equally as well for controlling the motor fields for obtaining like results.

I claim as my invention:

1. In a system of motor control, the combination with a main circuit comprising a source of current, and an electric motor, of a reactance device in said circuit, and a relay switch for controlling the voltage of said source, said switch having an actuating coil in parallel relation to said reactance device and so designed that said switch operates only when the coil is traversed by a current of predetermined value.

2. In a system of motor control, the combination with a main circuit comprising a source of current, and a dynamo-electric machine having a field magnet winding, of a reactance device in said circuit, and a relay switch for controlling the excitation of said field winding, said switch having a magnet coil in parallel relation to said reactance device and so designed that said switch operates only when said coil is energized above a predetermined degree.

3. In an electrical system, the combination with a dynamo-electric machine, of means for controlling the field excitation thereof, said means comprising relays operable when the value of the current in the circuit of the dynamo-electric machine changes at a predetermined rate and means for selectively controlling said relays.

4. In a system of motor control, the combination with an electrical circuit comprising a dynamo-electric machine, of manually operable means for controlling the value of the current traversing said circuit, and means for automatically controlling the value of the voltage applied to said circuit only when the change in value of the current traversing said circuit exceeds a predetermined rate.

5. In a system of motor control, the combination with a dynamo-electric machine having a field magnet winding, of means for automatically controlling the excitation of said winding in accordance with the rate of change in value of the current traversing the circuit of said dynamo-electric machine, said means comprising a reactance device and a relay switch having an actuating coil in circuit with said device.

6. In a system of motor control, the combination with a dynamo-electric machine having separately excited field magnet windings and a resistor in circuit with said windings, of means for controlling said resistor, said means being actuated when the change in value of the current traversing said dynamo-electric machine exceeds a predetermined rate.

7. In a system of motor control, the combination with a dynamo-electric machine having a field magnet winding, of means comprising a pair of relay switches for controlling the excitation of said field winding, and a reverse-current relay switch for selectively rendering either of said relay switches inoperative.

8. In a system of motor control, the combination with a dynamo-electric machine having a field magnet winding, of means for automatically controlling the excitation of said winding in accordance with the amount of change in value of the current traversing the circuit of said dynamo-electric machine and the rate at which said change occurs, said means comprising a resistor and a relay switch for controlling said resistor.

9. In an electrical system, the combination with a dynamo-electric machine, of means comprising a pair of relays for respectively varying the degree of field excitation of said dynamo-electric machine in opposite directions and means for selectively rendering the one or the other of said relays operative.

10. In an electrical system, the combination with a dynamo-electric machine, of means comprising a pair of relays for respectively varying the degree of field excitation of said dynamo-electric machine in opposite directions and means for selectively rendering the one or the other of said relays operative in accordance with the direction of the current traversing the circuit of said dynamo-electric machine.

11. In a system of motor control, the combination with an electric motor, and an electric generator in circuit therewith, of means for automatically controlling the voltage of said generator in accordance with the rate of change in value of the current supplied to said motor, said means comprising a reactance device in circuit with said generator and a relay switch having an actuating coil in circuit with said device.

12. In a system of motor control, the combination with an electric motor, and an electric generator in circuit therewith, of means for automatically controlling the voltage of said generator, said means comprising a reactance device in series circuit relation with said generator and said motor, a resistor and a relay switch having an actuating coil in circuit with said device.

13. In a system of motor control, the combination with an electric motor, and an electric generator in circuit therewith, of means for automatically controlling the voltage of said generator in accordance with the rate of change in value of the current traversing said circuit when said motor operates as a generator, said means comprising a relay and means controlled by motor circuit conditions for controlling the operation of said relay.

14. In a system of motor control, the combination with an electric motor, and an electric generator in circuit therewith, of means for automatically controlling the voltage of said generator in accordance with the rate of change in value of the current traversing said circuit when said motor operates as a generator, said means comprising a reactance device in circuit with said motor and said generator, a resistor, and a relay switch having an actuating coil in parallel relation to said reactance device.

In testimony whereof, I have hereunto subscribed my name this 17th day of July 1914.

WALTER O. LUM.

Witnesses:
M. J. ARNOLD,
B. B. HINES.